United States Patent

Getz

[15] 3,686,554
[45] Aug. 22, 1972

[54] MOTOR SPEED CONTROL

[72] Inventor: Edward H. Getz, St. Joseph, Mich.

[73] Assignee: Whirlpool Corporation

[22] Filed: March 11, 1971

[21] Appl. No.: 123,241

[52] U.S. Cl. ................................................318/327
[51] Int. Cl. ..............................................H02p 5/16
[58] Field of Search.......318/326, 327, 328, 341, 345

[56] References Cited

UNITED STATES PATENTS 3,206,665  9/1965  Burlingham ............... 180/106
3,340,951  9/1967  Vitt .......................... 318/312

*Primary Examiner*—Bernard A. Gilheany
*Assistant Examiner*—Thomas Langer
*Attorney*—James S. Nettleton, Thomas E. Turcotte, Burton H. Baker, Gene A. Heth, Franklin C. Harter, Anthony Niewyk, Robert L. Judd and Hofgren, Wegner, Allen, Stellman & McCord

[57] ABSTRACT

A digital control for regulating the speed of a moving device such as a motor. The control senses the speed of the motor and converts this information into a count. Upon the count reaching a preselected number, the control triggers a gated power control device controlling the electrical power supply to the motor so as to provide increased power to the motor when the instantaneous speed of the motor is below the desired speed and decreased power to the motor when the instantaneous speed of the motor is above the desired speed. By virtue of the digital circuitry of the control, the control may be formed as a simple integrated circuit control for effectively minimum cost.

16 Claims, 3 Drawing Figures

Patented Aug. 22, 1972

Inventor:-
Edward H. Getz,
By Hofgren, Wegner, Allen,
Stellman & McCord Attys.

Patented Aug. 22, 1972

MOTOR SPEED CONTROL

BACKGROUND OF THE INVENTION

1. Field of the Invention

This invention relates to control circuits and in particular to speed control circuits such as for controlling electric motors.

2. Description of the Prior Art

One conventional method of controlling the speed of an electric motor or similar moving device encompasses the use of an analog means for comparing a pulse having a width inversely proportional to the speed of the moving device with a reference wave form. The speed of the moving device is presented to the control in the form of the output of a tachometer generator having a variable frequency directly related to the speed of the device. The control converts the tachometer signal into the desired width pulse. A speed reference pulse is provided having a fixed width corresponding to a desired speed of the device. Thus, by comparing the width of the tachometer produced pulse with the reference pulse, an error signal is produced which may be used for controlling the electrical power supplied to the motor.

In another form of a conventional controller, digital means are utilized for providing an up/down counter wherein a reference signal pulse train is provided in the counter for comparison with a second pulse train generated by the moving device. The reference pulse train adds to the count while the second pulse train subtracts, so that at any given time the total count stored represents an error signal suitable for controlling an electrical motor.

Yet another conventional digital counter for use in connection with power supplies, such as for welding apparatus and the like, counts a series of high frequency pulses. When the count of these pulses reaches a preselected number, the control operates to provide an output signal. In such a control, the output comprises a constant phase angle power supply output which may be manually adjusted to obtain greater or lesser power as desired. Such a control is disclosed in U.S. Pat. No. 3,452,214 issued to Ricky Martin on June 24, 1969 for a Digital Wave Form Division for Power Control.

SUMMARY OF THE INVENTION

The invention comprehends a digital motor control circuit and control method for systems in which a gated device controls the power delivered to a motor. The operation of the control is synchronized to a reference time base which defines a series of time periods during which the circuit operations take place. During a first time period pulses are stored after being counted at a first rate for a time which is proportional to the speed of the motor. During the next successive time period pulses are counted at a second rate and added to the count stored previously until a predetermined number is reached which causes a triggering signal to be applied to the gated power control device. The control circuit may include a pair of digital counters constructed and operated such that during each of the time periods one counter is accumulating a number of pulses at the first rate while the second counter is accumulating pulses at the second rate and generating a triggering signal when the predetermined number is reached. Thus, the control circuit may be operated to produce a triggering signal for a gated power control device during each of the reference time periods, and the time spacing of each triggering signal will be determined by the speed of the motor during the previous time period.

More specifically, the motor control circuit operates in conjunction with a reference time base and includes a reference oscillator which generates two pulse trains having frequencies higher than that of the reference time base, a tachometer processing circuit which receives the tachometer signal and generates a pulse whose width is proportional to the speed of the motor, a pair of counter circuits which accumulate pulses from the reference oscillator, a synchronizing circuit which controls the operation of the counters, and a triggering circuit connected to the counters which generates a power control signal whenever either counter reaches a predetermined number. The control operates to vary the power supplied to the motor by selecting an appropriate firing angle from a set of discrete firing angles in accordance with the sensed motor speed.

A conventional 60 cycle power source may be used to operate the motor, and in this case the 60 cycle AC voltage may be conveniently used as the reference time base such that during each half cycle of this voltage, the motor speed is sensed and a power control signal is generated on the basis of the motor speed sensed during the previous half cycle.

The present motor control can be used to control power supplied to either an AC or DC motor, and may use as a reference time base a signal already present in the system such as when the motor is operated from an AC source, or may utilize a second reference oscillator to generate a time base which is independent of the power source.

The number of discrete firing angles available, the percentage of speed regulation desired, and the steady state speed desired can be easily attained due to the nature of the control. Further, the entire circuit can be produced in the form of a single integrated circuit requiring very few additional components to be added externally.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
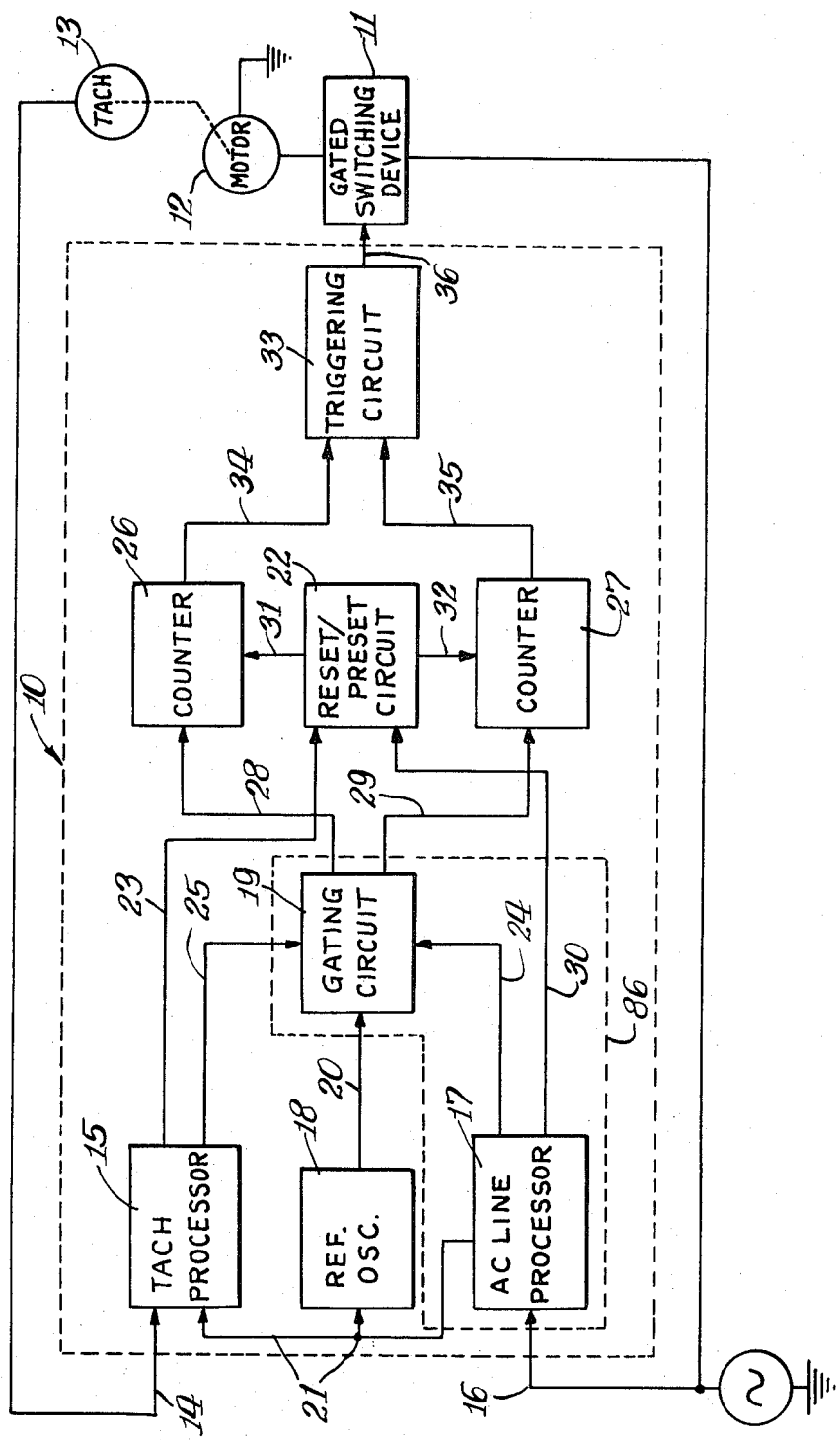
FIG. 1 is a schematic block diagram of a control apparatus embodying the invention.

In the exemplary embodiment of the invention as disclosed in the drawing, a control circuit generally designated 10 is shown to comprise a control suitable for controlling the operation of a gated switching control device 11 which may comprise a conventional SCR, Triac, or other gated power control device. The control device 11 may, in turn, control the application of power to an electromechanical device, such as an electric motor 12, which may comprise, as desired, an AC or a DC motor within the scope of the invention.

Apparatus 10 defines a digital control circuit which may be used to regulate or control the speed of motor 12. The speed of the moving device may be sensed by any device, such as a conventional tachometer generator 13, which produces an output signal indicative of the speed of the motor 12. In the present embodiment, tachometer generator 13 produces a wave form having a frequency which is directly proportional to the speed of the motor 12.

Two input signals are provided to the control apparatus 10 for controlling the gated control device 11. The first signal comprises the variable frequency feedback speed signal from tachometer 13 which is connected through an input lead 14 with a tachometer processor 15. The second input signal comprises a reference time base signal defining a series of substantially equal time periods, and in the present embodiment this signal comprises a conventional alternating current power supply signal coupled through a lead 16 to an alternating current (AC) line processor 17.

The AC line processor 17 and a gating circuit 19 combine to form what may broadly be termed a synchronizing circuit within the control circuit 10, as indicated by the dashed lines 86 in FIG. 1. As will be more fully understood from the continued description of the preferred embodiment, these combined circuits operate to synchronize the various control operations to each other and to the time periods defined by the reference time base signal.

More specifically, AC line processor 17 generates a signal coupled through lead 21 to the tachometer processor 15 which in turn generates an output signal coupled to a reset/preset circuit 22 through a connection 23 in response to the input signals from tachometer generator 13 and AC line processor 17. The AC line processor output signal is also coupled to a reference oscillator 18 through connection 21. Reference oscillator 18 generates two pulse trains which are coupled to a gating circuit 19 through a connection 20.

The AC line processor 17 further generates a second output signal which is directly coupled to gating circuit 19 through a lead 24. Gating circuit 19 receives a second input from tachometer processor 15 through a connection 25. Gating circuit 19 generates output signals respectively coupled to a first counter 26 and a second counter 27 through connections 28 and 29. Each counter may comprise eight flip-flops interconnected to define a conventional eight-bit digital counter.

AC line processor 17 further provides an output signal directly coupled through a lead 30 to the reset/preset circuit 22 which generates a pair of output signals respectively coupled to counters 26 and 27 through connections 31 and 32. The counters 26 and 27, in turn, generate output control signals coupled to a triggering circuit 33 through connections 34 and 35 in response to the signals from gating circuit 19 and reset/present circuit 22. Triggering circuit 33 generates a control output signal coupled to the gated control device 11 through a connection 36.

Figure 2:
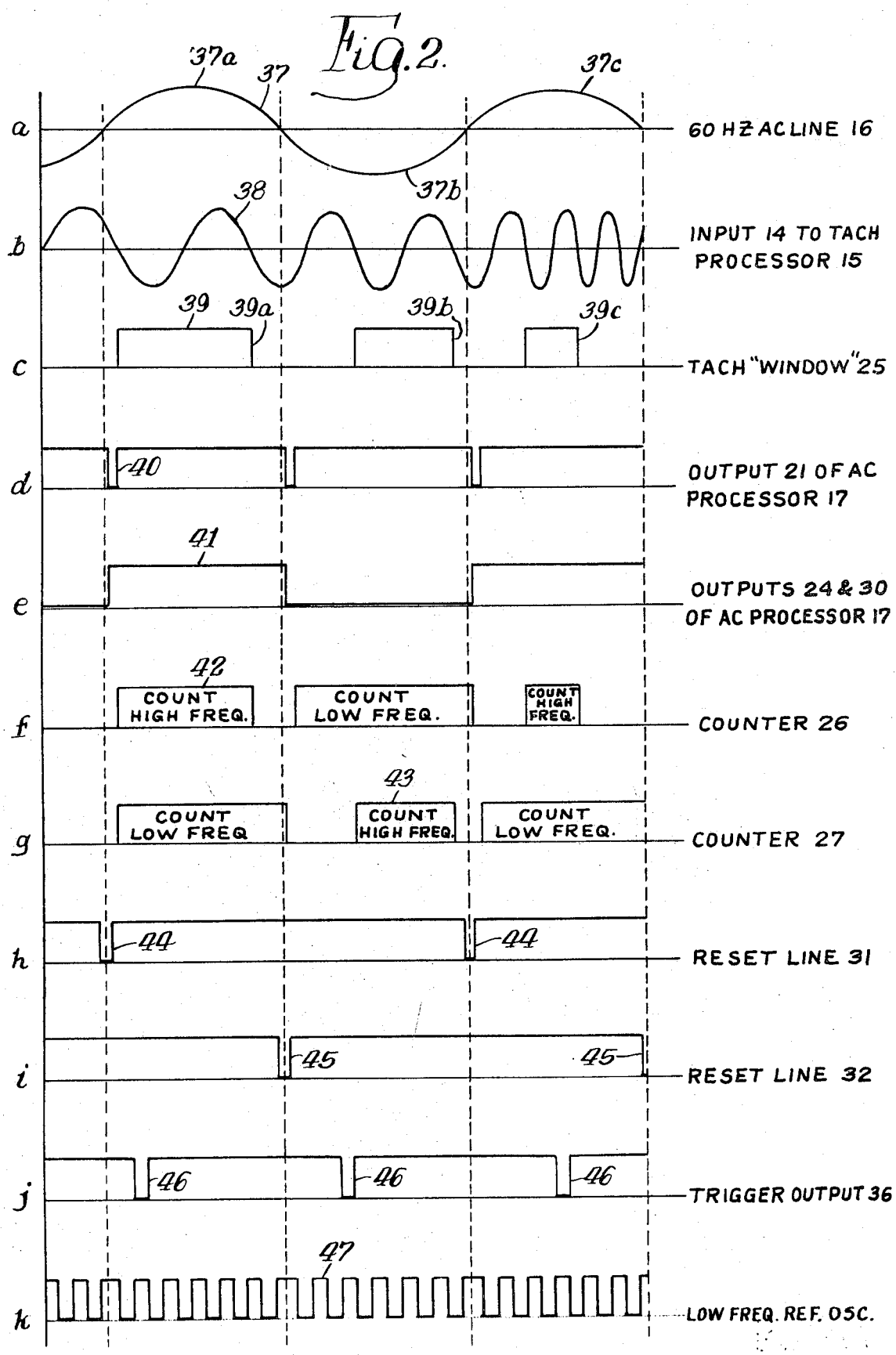
FIG. 2 is a graphic representation of various control signals of the control apparatus.

A more specific understanding of the operation of control apparatus 10 may be seen with reference to the block diagram of FIG. 1 and the comparative wave forms of FIG. 2 illustrating the various signals present in the normal operation of control apparatus 10. Thus, as shown in FIG. 2, the input signal to the AC line processor 17 is a sinusoidal signal which may be taken from a conventional 60 Hz. AC power supply voltage.

The signal generated by tachometer generator 13 is shown in FIG. 2(b) as a variable frequency sine wave signal wherein the frequency varies directly with the speed of the motor 12. Thus, as shown in FIG. 2(b), in the illustrative embodiment, the speed of the motor is increasing so as to increase the frequency and decrease the period of the tachometer speed signal with time starting from the zero point represented by the lefthand vertical line.

Tachometer processor 15 converts the variable frequency signal 2(b) into a pulse signal 2(c) having a width equal to the period of the tachometer signal at connection 14. In the illustrated embodiment, the tachometer pulse signal comprises a "window" 39 having a width corresponding exactly to the period of one complete oscillation of the tachometer sine wave 38. Where a plurality of tachometer sine waves 38 are generated during the period of a single AC input half wave 37, only a single complete full tachometer wave signal is caused to generate the tachometer "window," as seen in FIG. 2(c). Thus, as a result of increasing frequency of the tachometer signal 38, three different width tachometer windows are provided, namely, window 39a associated with the first positive half wave 37a of the input sine wave, window 39b associated with the succeeding negative half wave 37b of the input sine wave, and window 39c associated with the subsequent positive half wave 37c.

The signal provided from AC line processor 17 to tachometer processor 15 through connection 21 comprises a narrow pulse 40 illustrated in curve 2(d) which is substantially synchronized with each zero voltage condition of the AC input signal curve 2(a). The pulse is similarly delivered through connection 21 to reference oscillator 18. The AC line processor 17 further delivers a signal comprising a 60 cycle square wave which is substantially synchronized to the AC signal of curve 2(a) as illustrated by 41 in curve 2(e), through connections 24 and 30 to gating circuit 19 and reset/preset circuit 22, respectively.

Gating circuit 19 operates on the tachometer window signals 39, the high and low frequency pulse trains received from reference oscillator 18, and the square wave signal received from AC line processor 17 to energize one of the counters 26 or 27 to count high frequency pulses during the time duration of the tachometer window during any given half cycle of the AC line input signal and to energize the other counter to count low frequency pulses for essentially the entire half cycle.

The high frequency count received by either counter 26 or 27 is stored therein at the termination of the tachometer window. During the next half cycle of the sine wave 37, this counter is again energized to now count the low frequency pulses delivered through gating circuit 19 and to accumulate the count thereof with the previously stored high frequency pulses. The timing of the two operating modes of counters 26 and 27 is illustrated by curves 2(f) and 2(g), bringing out the concept that one counter is counting high frequency counts at the same time the other counter is counting low frequency counts during each half cycle of the AC input signal.

The reset/preset circuit 22 provides a pulse 44 each time counter 26 completes a low frequency count for resetting the counter to zero and thereby insuring that the high frequency count begins with a zero count. The reset/preset circuit provides a second pulse 45 each time counter 27 completes a low frequency count for resetting the counter to zero and thereby insuring that the high frequency count thereof begins with a zero count. Pulses 44 and 45 are illustrated in curves 2(*h*) and 2(*i*), respectively.

Gating circuit 19 controls the operation of counters 26 and 27 to assure the alternate counting of the high frequency and low frequency outputs of the reference oscillator 18 so that one counter is counting low frequency counts while the other counter is counting high frequency counts.

The triggering circuit 33 is connected to counters 26 and 27 in such a manner that an output pulse is provided through connection 36 to turn on the gated control device 11 when the total accumulated count in either one of the counters reaches a preselected number.

To assure that the preselected number is reached only during the low frequency count, gating circuit 19 is arranged to terminate high frequency counting whenever the total high frequency count reaches a number one less than the preselected number. Thus, at least one count must be provided during the subsequent low frequency count during the next successive half cycle of the AC input wave 37 before the triggering pulse is delivered to device 11 from the output decoder 33. This assures that the power control or output signal will not be generated until the half cycle of the AC input signal 37 following the half cycle in which the motor speed was sensed.

The output pulses 46 are spaced from the zero voltage condition of the AC input signal by a time period which corresponds to the number of low frequency pulses added to the stored high frequency count to cumulatively produce the preselected number. Thus, the phase position of the output pulses varies during each half cycle to provide a variable control of the power delivery to the motor 12 during each half cycle operation thereof.

The number of low frequency pulses which may be provided during a complete half cycle of the AC input signal 37 controls the firing angle of the gated device 11. If the motor is running at a low speed so that the total high frequency pulse count is one less than the preselected number, the first low frequency pulse will initiate the formation of output pulse 46 at the beginning of the low frequency count. Thus, the output pulse will be produced substantially at the beginning of the AC power supply half wave corresponding thereto so that substantially full power will be delivered to the motor 12. Conversely, where the speed of motor 12 is high, the number of high frequency pulses counted may be so small as to prevent the addition of the entire number of low frequency pulses in the subsequent half wave operation to reach the total preselected number. Under this condition, no firing of the gated device 11 will occur producing no power during that half cycle and thereby tending to reduce the speed with maximum correction.

The reset/preset circuit 22 further is arranged to sense a condition wherein the motor is running at such a low speed that the tachometer signal will not complete a single cycle suitable to generate a complete tachometer window. If this condition occurs, the reset/preset circuit 22 operates to preset both counters 26 and 27 so that an output pulse 46 is generated at the next zero crossing of the AC signal 37 thereby applying substantially full power to the motor to cause the desired increase in the speed thereof.

To provide desired control or variability of the operating characteristics of control circuit 10, adjustability of the high frequency count rate, the low frequency count rate, and the predetermined count number for triggering the device 11 may be provided. Further, the width of the tachometer windows 39 may be varied so as to obtain more or less counts with a given high frequency and low frequency rate. As will be obvious to those skilled in the art, variation in the number of pulses necessary to provide the output signal to device 11 may be effected by suitably adjusting counters 26 and 27 and/or their connections to the triggering circuit 33.

More specifically, the relationship between the desired steady state or set motor speed, the period of the tachometer signal at set speed, the percentage of speed regulation desired, and the number of discrete firing angles desired during each time period defined by the reference time base signal is expressed by the following formula for determining the frequency of the high frequency section of the reference oscillator circuit 18:

$$\text{hi ref. osc. freq.} = \frac{\text{no. of firing angles desired per reference time period}}{(1/100)\ (\%\ \text{speed regulation desired})\ (\text{period of tachometer sign alat set speed—sec.})}$$

In the preferred embodiment, the time periods defined by the reference time base signal each comprise one-half cycle of the 60 Hz AC line voltage.

The frequency of the second pulse train from the reference oscillator circuit 18 is determined as follows:

$$\text{low ref. osc. freq.} = \frac{\text{no. of firing angles desired per reference time period}}{\text{duration of reference time period—sec.}}$$

This low frequency output from reference oscillator 18 is synchronized to the AC line voltage at each zero crossing by means of the signal received on connection 21 from the AC line processor 17. The low frequency output of reference oscillator 18 is illustrated by curve (*k*) of FIG. 2, and as can be seen from this curve the synchronizing assures that the time positioning of the individual pulses is the same for each one-half cycle of the AC line voltage.

For the preferred embodiment of the invention, given the high frequency output of the reference oscillator, the count which counter 26 or 27 should accumulate during the tachometer window when the motor is running at the desired speed is given by:

$$\text{Count} = \frac{\text{high reference osc. frequency}}{\text{frequency of tachometer signal at the desired speed}}$$

Once the above count is determined, the total count which should be accumulated before a triggering signal is generated is equal to the sum of the above count and the number of low frequency oscillator pulses per half cycle of the AC line voltage.

Thus, control apparatus 10 operates in conjunction with a reference time base to control the speed of the electric motor 12 by sensing the speed of the motor, providing during a first preselected portion of the reference time base signal a count corresponding inversely to the speed of the motor, providing during a second preselected portion of the reference time base signal a count at a preselected fixed rate, and varying the power delivered to the motor as a direct function of the time during each of the signal portions that it takes the total cumulative count to reach a preselected number. The control functions such that the counting circuits 26 and 27 operate in a complementary manner to provide a control pulse each half cycle of the AC power supply.

The degree of control, or the firing angle resolution, of the gated device 11 may be suitably selected by adjusting the low frequency output from the reference oscillator circuit 18. Inasmuch as the control circuit operates to select one of a set of possible firing angles during each half cycle of the AC line voltage, the greater the number of firing angles in the set, the greater the degree of power control. Since the number of possible firing angles is equal to the number of low frequency pulses produced during each half cycle of the AC line voltage, it can be seen that the accuracy of the control can be increased by increasing the frequency of the low frequency output of the reference oscillator 18.

It is important to note that while the present embodiment of the invention is designed to synchronize the control operations to the 60 Hz power source for the motor, in its broad aspect the invention comprehends a motor control circuit which can synchronize its sensing and control operations to essentially any reference signal which defines a series of time periods. Thus, the reference time base need not be associated with the power source but may, for example, be generated internally of the circuit. Should some other sinusoidal reference signal be used to define a time base, it may be fed directly to the AC line processor 17. If a nonsinusoidal time base reference signal is to be used, some modification of the AC line processor 17 may be necessary, as will be understood by those skilled in the art.

Figure 3:
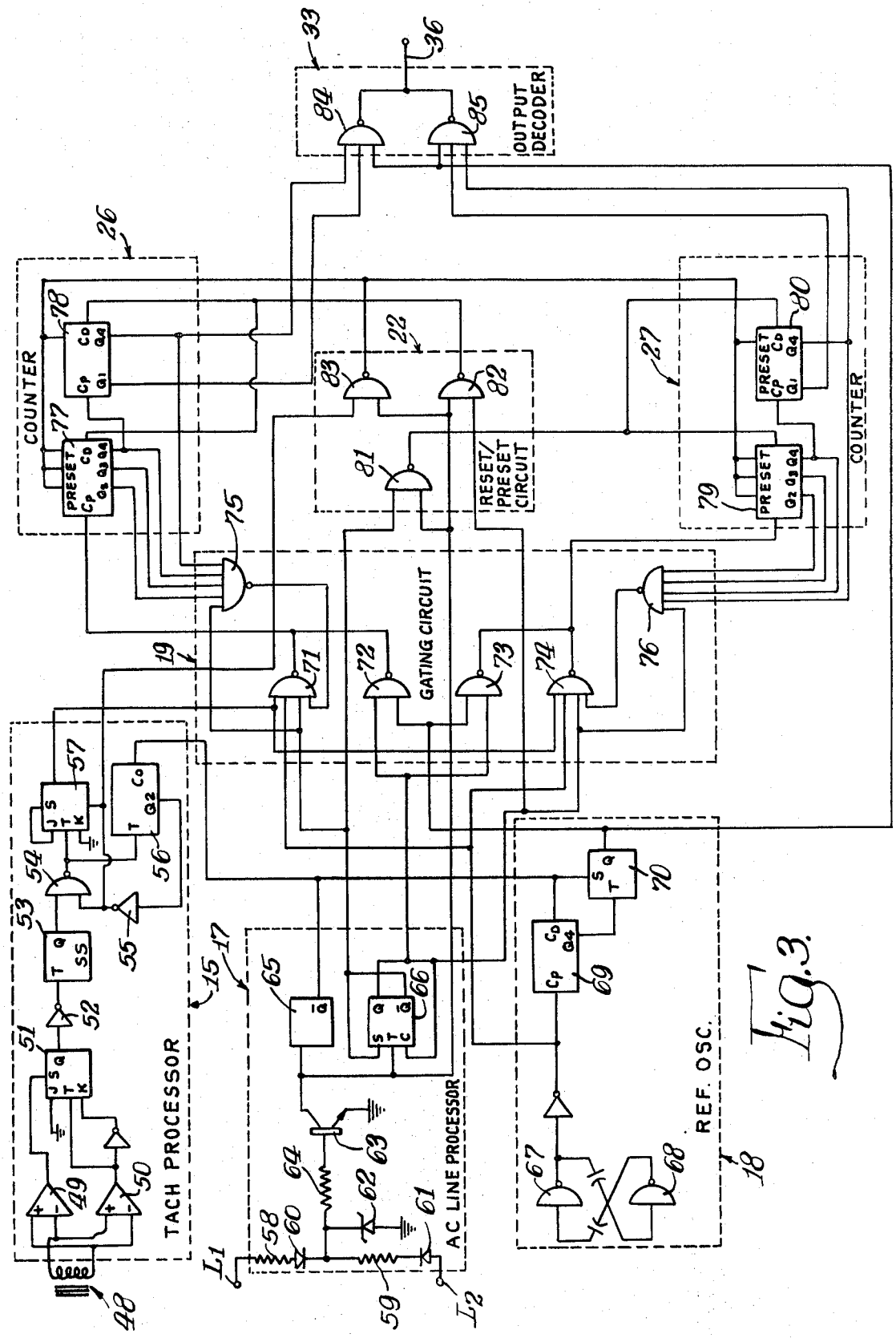
FIG. 3 is a schematic logic diagram of the control apparatus shown in block form in FIG. 1.

Referring now to FIG. 3, a control circuit providing the desirable functioning and utilizing of the control elements of apparatus 10 as discussed above is shown in greater detail. More specifically, tachometer processor 15 includes an input coil 48 inductively coupling the tachometer speed signal to a pair of amplifiers 49 and 50 which deliver the amplified signals to a conventional J–K flip-flop 51. As a result of the signals provided by amplifiers 49 and 50, flip-flop 51 acts to change the state of its output for each pulse delivered by tachometer 13, thereby providing a square wave output corresponding to the input tachometer signal. This square wave is inverted by an inverter 52 and applied to the triggering input of a monostable multivibrator or one-shot 53. One-shot 53 produces a narrow output pulse whenever its input changes state from high to low. Thus, a narrow output pulse produced by one-shot 53 corresponds to each cycle of the tachometer signal. The multivibrator pulses are logically conjuncted by NAND gate 54 with an output from an inverter 55 which is connected with an electronic counter 56, such that gate 54 provides pulses to the trigger input of a flip-flop 57 and to the toggle input of counter 56. Counter 56 receives a reset pulse from the AC line processor 17 each time the input sine wave 37 becomes zero to cause the first pulse generated by multivibrator 53 following the zero condition of the AC input signal to cause the NAND gate 54 to trigger flip-flop 57. Should a second pulse from tachometer 13 be produced by multivibrator 53 before the next zero condition of the AC input signal 37, NAND gate 54 will produce a pulse which again triggers flip-flop 57 and counter 56, causing output Q2 of counter 56 to go high and thereby causing the output of inverter 55 to go low and correspondingly prevent further tachometer pulses from triggering flip-flop 57 until counter 56 is reset by the next zero crossing of the AC input signal. Thus, flip-flop 57 produces the desired tachometer windows 39 of curve 2(c) for delivery to the gating circuit 19 as discussed above. The size of the windows produced by flip-flop 57 may be varied by coupling different stages of counter 56 with the input of inverter 55.

AC line processor 17 provides full wave rectification of the input power supply delivered thereto through leads L1 and L2 defining input 16. Rectification and signal shaping are effected by means of suitable resistors 58 and 59, diodes 60 and 61, and a Zener diode 62. The rectified and shaped output is delivered to the base of NPN transistor 63 through a resistor 64 to trigger a monostable multivibrator or one-shot 65 and a flip-flop 66. The output of multivibrator 65 comprises the pulse signal 40 of FIG. 2(d) and the output of flip-flop 66 comprises the pulse signal 41 of FIG. 2(e). Reference oscillator 18 comprises two cross-coupled NAND gates 67 and 68, a counter 69 and a J–K flip-flop 70. Flip-flop 70, as well as flip-flops 51, 57 and 66 discussed above, is operated in control 10 in essentially a toggle mode so as to effectively comprise a frequency divider. Counter 69 and flip-flop 70 form a digital frequency division circuit which produces the low frequency output from the reference oscillator circuit 18. The relationship between the low frequency output and the high frequency output from reference oscillator 18 can be varied by changing the amount of division effected by counter 69 and flip-flop 70. As is well known by those skilled in the at, digital frequency division by almost any integer can be readily accomplished, thus almost any low frequency output desired may be obtained from a given high frequency output of reference oscillator 18.

One-shot 65 is connected to flip-flop 70 to produce a low frequency pulse train synchronized to the AC input 37. The high frequency pulse train is delivered to a NAND gate 71. One-shot 65 causes counter 69 to reset and set flip-flop 70 to a high state at each zero condition of the AC input 37 to assure that the low frequency pulses initiate at substantially the same point during each half cycle of the AC input. As discussed above, the low frequency output pulses are illustrated in FIG. 2(k). Output pulses from flip-flop 66 are delivered to NAND gates 71, 72, 73 and 74. NAND gates 71 and 72 deliver control signals to counter 26 and NAND gates 73 and 74 deliver control signals to counter 27. NAND gates 71 and 74 provide high frequency pulses to counters 26 and 27, respectively, during alternate tachometer windows 42 and 43 shown in FIGS. 2(*f*) and 2(*g*). NAND gates 72 and 73 provide low frequency pulses to counters 26 and 27, respectively, during alternate low frequency counting periods.

NAND gates 75 and 76 are connected respectively to NAND gates 71 and 74 and sense the counts accumulated in counters 26 and 27, respectively, to disable the respective gates against applying high frequency pulses to either counter 26 or 27 when the total count delivered thereto reaches one below the preselected number. Each of counters 26 and 27 comprises a pair of cascaded, four stage binary counters 77 and 78 and 79 and 80, respectively.

As shown in FIG. 3, reset-preset circuit 22 includes three NAND gates 81, 82 and 83. NAND gate 81 combines the complement of the 60 cycle square wave provided by AC line processor 17 with zero crossing pulses provided to provide a reset pulse for counter 27. NAND gate 82 combines the normal 60 Hz square wave output produced by AC line processor 17 with the zero crossing pulses to provide a reset pulse for counter 26. NAND gate 83 receives the zero crossing pulses and the inverted output from the last stage of the counter 56 to sense the termination of a tachometer window during each half cycle of the AC input wave 37. NAND gate 83 presets counters 26 and 27 in the absence of the generation of such a window to insure that the first low frequency pulse received in the counters during the next half cycle will generate the desired output pulse as discussed previously to provide substantially full power to the motor 12.

Triggering circuit 33 includes a pair of NAND gates 84 and 85 which receive output signals from counters 26 and 27 and a low frequency output signal from reference oscillator 18. Resultingly, when the count received NAND gate 84 from counter 26 reaches the number which causes both inputs from that counter to go high, the next low frequency pulse generates a negative going pulse transmitted from the triggering circuit to the gated control device 11 to trigger the device in the desired time-spaced relation with the zero voltage crossing of the AC power supply delivered to the device 11 through connection 16. Similarly, a triggering pulse is obtained from NAND gate 85 when a corresponding count is reached in counter 80. Any suitable means may be provided in connection 36 for delivering the output signal from output decoder 33 to the gate of the control device 11, such as a conventional pulse transformer and switching transistor means conventionally utilized to provide such gate signal deliveries.

The circuit components of apparatus 10 comprise conventional components well known to those skilled in the art. Illustratively, one-shots 53 and 65 may comprise MC851 multivibrators, counters 26 and 27 may comprise MC839 counters, flip-flops 51 and 70 may comprise MC853 J-K flip-flops, and flip-flops 57 and 66 may comprise MC831 clocked flip-flops.

Illustratively, given a desired steady-state speed of 90 RPM, a desired speed regulation of 12.5 percent, a tachometer which produces 480 pulses per second at 90 RPM, and assuming 16 discrete firing angles are desired per time period defined by the reference time base, the high frequency output of reference oscillator circuit 18 should be 61.4 KHz, as determined by the aforementioned formula. Similarly, assuming that the reference time base signal is the 60 Hz AC line voltage, the low frequency output of reference oscillator 18 should be 1.9 KHz.

Assuming that the instantaneous speed sensed by the tachometer is 12.5 percent below the desired 90 RPM, more pulses would be generated in the high frequency than the desired 128 representing the count corresponding to 90 RPM of the moving device. More specifically, 144 pulses would be counted. After the first low frequency pulse is counted, the control will turn the SCR on to provide maximum power to the motor 12 thereby to adjust the speed upwardly. Corresponding changes in the time of turning on of the gated control device will then be suitably effected on each half cycle to continuously adjust the power delivery to the motor to cause the motor to approach accurately the desired operating speed. In the present example, whenever the motor is running just over the desired speed no power will be applied because the total count necessary to produce an output pulse will not be reached. This operation provides for rapid recovery of the proper operating speed.

Thus, control apparatus 10 provides an improved digital control for regulating the speed of a moving device such as an electric motor by means of a digital count functioning. The control provides a continuous regulation of the moving device so as to provide high accuracy in the regulated speed thereof while yet providing this functioning at effectively minimum cost by virtue of the ability of the control to be formed as a single integrated circuit device having high accuracy and minimum maintenance requirements. Thus, the control is particularly well adapted for use in controlling electric drive motors of appliances, such as automatic washing machines, dryers, and the like. By virtue of the improved control, the motor may be employed as a direct drive in an automatically controlled appliance and is readily adaptable for variable preselected speed operation of the motor as well as for automatic reversing operation of the motor. The control is equally adaptable for use with AC and DC motors and, thus, is particularly well suited for use in connection with clothes dryers utilizing variable tumble speeds. By virtue of the ease and predictability with which the set speed, percentage regulation, and firing angle resolution can be varied, the control may be used in a relatively wide range of motor control applications. Further, the control permits facilitated use of low level sensing devices for providing desired input signals whereby further improved control of a moving device relative to a number of sensed conditions may be readily obtained.

The foregoing disclosure of specific embodiments is illustrative of the broad inventive concepts comprehended by the invention.

The embodiments of the invention in which an exclusive property or privilege is claimed are defined as follows:

1. A control circuit for selectively triggering a gated device such as for controlling the speed of an electrically operable moving device, comprising: means for signalling a series of time periods; means for providing a first count proportional to the speed of the device during one of said time periods; means for accumulating a second count with said first count in a subsequent time period; and means for delivering a signal for triggering a gated device when the cumulative count reaches a preselected number, whereby the gated device is triggered earlier in said subsequent time period when the speed of the moving device is less than a desired speed to cause the speed of the moving device to increase to said desired speed.

2. The control circuit of claim 1 wherein said means for signalling said time periods comprises means providing an alternating current power supply and said gated device controls power delivery from said power supply to said moving device.

3. The control circuit of claim 1 wherein said first count is inversely proportional to the speed of said moving device.

4. The control circuit of claim 1 wherein said means for delivering a triggering signal provides said signal only when the speed of the moving device is at or below said desired speed.

5. The control means of claim 2 including means for selectively adjusting the preselected number for varying the time of delivery of said triggering signal.

6. The control device of claim 5 wherein means are provided for preventing said first count from reaching said preselected number thereby requiring at least a count of one in said second count to cause delivery of said triggering signal.

7. The control circuit of claim 6 wherein said means for providing a triggering signal includes means for producing said triggering signal during each half cycle of said alternating current power supply.

8. The control circuit of claim 7 wherein said means for providing a triggering signal includes means for spacing said signal from the zero voltage points of said alternating voltage by an amount which is dependent on the cumulative count accumulated immediately previously.

9. A circuit for controlling the amount of power delivered to a motor from a power source, said circuit comprising:
a. signal source means for providing a reference time base signal which defines a series of time periods;
b. power control means connecting said motor with said power source for controlling the amount of power supplied to said motor;
c. speed sensing means for providing a signal indicative of the speed of said motor;
d. first circuit means connected to said speed sensing means and operative to produce a first series of pulses for an interval which is dependent upon the speed of said motor;
e. second circuit means for producing a second series of pulses;
f. counting circuit means for accumulating the pulses produced by said first and second circuit means;
g. a triggering circuit connected to said counting circuit means and operative to energize said power control means whenever a predetermined count is accumulated by said counting circuit means; and
h. a synchronizing circuit for synchronizing the operation of said counting circuit means and said triggering circuit to said reference time base signal.

10. The control circuit of claim 9 wherein said reference time base source comprises an AC power source from which said motor is operated.

11. The control circuit of claim 10 wherein said first circuit means operates to produce said first series of pulses at a first preselected rate and said second circuit means operates to produce said second series of pulses at a second preselected rate.

12. The control circuit of claim 11 wherein said first preselected rate is greater than said second preselected rate.

13. The control circuit of claim 12 wherein said synchronizing circuit operates to effect counting of said first series of pulses during a first half cycle of the alternating voltage wave produced by said AC power source and to effect counting of said second series of pulses during the next subsequent one of said half cycles.

14. A method of controlling the speed of a motor operated from a gated device comprising the steps of:
a. providing a reference signal defining a series of time periods;
b. counting pulses at a first rate for a time interval proportional to the speed of the motor during a first of said time periods;
c. counting pulses at a second rate during a preselected subsequent one of said time periods;
d. generating a triggering signal for said gated device when the total count accumulated reaches a predetermined number; and
e. repeating steps (b), (c) and (d) at a frequency which is synchronized to said reference signal.

15. The method of claim 14 wherein the frequency at which steps (b), (c), and (d) are repeated is equal to the frequency of the reference signal.

16. The control circuit of claim 1 wherein said second count is at a preselected fixed rate.

* * * * *